(12) United States Patent
Kong et al.

(10) Patent No.: US 8,549,454 B1
(45) Date of Patent: Oct. 1, 2013

(54) SYSTEM AND METHOD FOR AUTOMATED CONFIGURATION OF DESIGN CONSTRAINTS

(75) Inventors: Raymond Kong, San Jose, CA (US);
David A. Knol, Morgan Hill, CA (US);
Frederic Revenu, San Carlos, CA (US);
Dinesh K. Monga, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/554,418

(22) Filed: Jul. 20, 2012

(51) Int. Cl.
*G06F 17/50* (2006.01)

(52) U.S. Cl.
USPC ........... 716/117; 716/110; 716/116; 716/111; 716/122

(58) Field of Classification Search
USPC .................. 716/110, 111, 114, 116, 117, 122
See application file for complete search history.

(56) References Cited

U.S. PATENT DOCUMENTS

| | | | | |
|---|---|---|---|---|
| 5,499,192 A * | 3/1996 | Knapp et al. | | 716/102 |
| 5,835,751 A * | 11/1998 | Chen et al. | | 716/117 |
| 5,956,257 A * | 9/1999 | Ginetti et al. | | 716/103 |
| 6,857,116 B1 * | 2/2005 | Dahl et al. | | 716/125 |
| 7,281,233 B1 * | 10/2007 | Sivasubramaniam | | 716/105 |
| 7,546,408 B1 * | 6/2009 | Donlin et al. | | 710/305 |
| 7,584,448 B1 * | 9/2009 | Reynolds et al. | | 716/138 |
| 7,930,661 B1 * | 4/2011 | Trimberger et al. | | 716/104 |
| 2004/0128626 A1 * | 7/2004 | Wingren et al. | | 716/1 |
| 2009/0007050 A1 * | 1/2009 | Martin et al. | | 716/16 |
| 2009/0271750 A1 * | 10/2009 | Richardson et al. | | 716/6 |
| 2009/0300568 A1 * | 12/2009 | Kuroda | | 716/10 |

* cited by examiner

*Primary Examiner* — Vuthe Siek
*Assistant Examiner* — Brian Ngo
(74) *Attorney, Agent, or Firm* — LeRoy D. Maunu (57) ABSTRACT

In one embodiment, a method for propagating design constraints between a module and a module instance in a circuit design is provided. A port of the module and a port/pin of the circuit design are determined, between which constraints are to be propagated. The determination of the port/pin includes determining whether or not pin of the module instance corresponding to the port is directly connected to a top-level port of the circuit design. In response to determining that the pin is directly connected to a top-level port, the top-level port is selected as the port/pin. In response to determining that the pin is not directly connected to the top-level port, the pin is selected as the port/pin. Design constraints are propagated between the port and the selected port/pin. The propagated design constraints are stored in a storage device.

14 Claims, 4 Drawing Sheets

SYSTEM AND METHOD FOR AUTOMATED CONFIGURATION OF DESIGN CONSTRAINTS

TECHNICAL FIELD

The disclosure generally relates to input/output (I/O) interfaces, and more particularly to the automated determination of design constraints associated with the I/O interfaces.

BACKGROUND

Programmable integrated circuits (ICs) are often used to implement digital logic operations according to user configurable input. Example programmable ICs include complex programmable logic devices (CPLDs) and field programmable gate arrays (FPGAs). CPLDs often include several function blocks that are based on a programmable logic array (PLA) architecture with sum-of-products logic. A configurable interconnect matrix transmits signals between the function blocks.

An example FPGA includes an array of configurable logic blocks (CLBs) and a ring or columns of programmable input/output blocks (IOBs). The CLBs and IOBs are interconnected by a programmable interconnect structure (routing resources). The CLBs, IOBs, and interconnect structure are typically programmed by loading configuration data ("configuration bitstream") into internal configuration memory cells. The state of the configuration memory cells determines the function of the CLBs, IOBs, and interconnect structure. The configuration bitstream may be read from an external memory, such as an EEPROM, EPROM, PROM and the like, though other types of memory may be used.

A typical design process begins with the creation of a circuit design. The circuit design specifies the function of a circuit at a schematic or logic level and may be represented using various hardware description languages (e.g., VHDL, ABEL, or Verilog) or schematic capture programs. The design is synthesized to produce a logical network list ("netlist"), and the synthesized design is mapped onto primitive components within the target device (e.g., programmable logic blocks of an FPGA).

Following mapping, placement of the components of the synthesized and mapped design is performed for the target device. During placement, each mapped component of the design is assigned to a physical position on the device. The placer attempts to place connected design objects in close physical proximity to one another in order to conserve space and increase the probability that the required interconnections between components will be successfully completed by the router. Placing connected components close to one another also generally improves the performance of the circuit since long interconnect paths are associated with excess capacitance and resistance, resulting in longer delays and greater power consumption.

To expedite development, respective teams of developers may develop different sub-circuits of a circuit design in parallel. However, such development must be properly coordinated between the teams so that all of the sub-circuits are placed and routed to meet various requirements of the respective sub-circuits such as timing requirements, resource requirements, etc. The timing and resource requirements of a circuit are specified as design constraints in a design constraints language. The circuits are placed and routed using the design constraints to ensure that requirements specified by the design constraints are satisfied in the placed and routed design.

There are two general implementation methodologies for parallel development: top-down and bottom-up. In the top-down approach, design tools implement a top-level circuit design first while treating modules as black-box instantiations. Respective development teams may then implement each module separately. A design may have a number of levels of hierarchy, where each module instantiation may contain sub-module instantiations. Typically, design floor planning is performed on a top-level design to allocate physical resources and timing budgets for each sub-module instantiation. This step is critical in dividing the overall design requirements and distributing them among the set of module instantiations. As each sub-module is implemented independent from the parent module (or context logic), it is imperative that the design constraints are applied to the module from the instantiation of the module. These design constraints serve as a specification for the sub-module of the parent module (or context logic) and thus become a requirement as to how the sub-module is to be implemented relative to its parent. The design constraints specified on an instantiation of a module are manipulated and applied to the module. For ease of reference, an instantiation of a module in a circuit design may be referred to as either a module instantiation or a module instance, and such terms are used interchangeably herein. For ease of reference, application of design constraints of a module instantiation to the module may be referred to as instance-to-module constraint propagation.

In the bottom-up approach, the tools implement the leaf sub-modules in the hierarchy first. The design tools incorporate the implemented sub-modules with parent logic in the next higher level and implement the sub-modules and parent logic together. This bottom-up process continues to implement each next-higher level of hierarchy until the entire circuit design is successfully implemented. As each module is implemented, design constraints are applied to control resource usage and to achieve target frequency requirements for the specific module. When the module is instantiated into its parent logic, the module's previous implementation may or may not apply depending on the overall objective. In one case, the module is reused as a hard core (e.g. module with implementation). In another case, the module is treated as a soft core (e.g., module without implementation). In the latter case, as the module instance is implemented together with its parent logic, it is imperative to apply the previously defined design constraints of the module to ensure the same requirements continue to be met. Similarly, the constraints specified for a module implementation are applied to the module instance while it is implemented together with its parent. For ease of reference, application of design constraints of a module to an instantiation of the module may be referred to as module-to-instance constraint propagation.

SUMMARY

In one embodiment, a method for propagating design constraints between a module and a module instance in a circuit design is provided. Using a programmed processor, a port/pin of the circuit design is determined for a port of the module, between which constraints are to be propagated. The determination of the port/pin includes determining whether or not the pin of the module instance is directly connected to a top-level port of the circuit design. In response to determining that the pin of the module instance is directly connected to a top-level port of the circuit design, the top-level port is selected as the port/pin of the circuit design. In response to determining that the pin of the module instance is not directly connected to the top-level port of the circuit design, the pin of the module instance is selected as the port/pin of the circuit design. Using the programmed processor, design constraints are propagated between the port of the module and the selected port/pin. The propagated design constraints are stored in a storage device.

In another embodiment, a method for propagating design constraints between a module and a module instance in a circuit design is provided. Using a programmed processor, for a port of the module a port/pin of the circuit design is determined, between which constraints are to be propagated. The determination of the port/pin includes determining whether or not the module includes an I/O buffer connected to the port of the module. In response to determining that the module includes an I/O buffer is connected to the port of the module, a top-level port of the circuit design that is connected to the pin of the module instance is selected as the port/pin of the circuit design. In response to determining that the module does not include an I/O buffer connected to the port of the module, the port/pin of the circuit design is selected as the pin of the module instance that corresponds to the port of the module. Using the programmed processor, design constraints are propagated between the port of the module and the selected port/pin. The propagated design constraints are stored in a storage device.

In yet another embodiment, a system for propagating design constraints in a circuit design is provided. The system includes a processor and a memory arrangement coupled to the processor. The memory arrangement is configured with instructions that when executed by the processor causes the processor to identify design constraints for the circuit design. The instructions further cause the processor to determine a port/pin of the circuit design for a port of the module, between which constraints are to be propagated. The determination of the port/pin includes determining whether or not the pin of the module instance is directly connected to a top-level port of the circuit design. In response to determining that the pin of the module instance is directly connected to a top-level port of the circuit design, the instructions cause the processor to select the top-level port as the port/pin of the circuit design. In response to determining that the pin of the module instance is not directly connected to the top-level port of the circuit design, the instructions cause the processor to select the pin of the module instance as the port/pin of the circuit design. The processor is configured to propagate the design constraints between the port of the module and the port/pin in response to the port of the module or the port/pin of the circuit design including one or more of the design constraints. The propagated design constraints are stored in a storage device.

It will be appreciated that various other embodiments are set forth in the Detailed Description and Claims, which follow.

BRIEF DESCRIPTION OF THE DRAWINGS

Various aspects and advantages will become apparent upon review of the following detailed description and upon reference to the drawings, in which.

DETAILED DESCRIPTION

In top-down or bottom-up implementation methodologies, it is often necessary to propagate design constraints between module ports and pins/ports in a circuit design including an instantiation of the module. As explained in more detail below, propagation of a design constraint copies a design constraint from one port/pin, converts logical names for cells, nets, and/or pins of the design constraint to correspond to a location in the design hierarchy of a second port/pin, and adds the converted design constraint to the second port/pin.

However, such propagation between modules and module instantiations of a circuit design is not straightforward and often requires a designer to manually modify and verify the design constraints. For instance, as explained in more detail below, propagation may be particularly challenging since constraints are not always propagated between a port of a module and a corresponding pin of an instantiation of the module. Rather, in some scenarios, constraints may be propagated between a port of a module and a port in the top-level design that includes the module instance. As a circuit design may require a number of constraints to be propagated for hundreds or thousands of different modules, such manual propagation can be overly burdensome.

One or more embodiments provide a method for automated propagation of the design constraints between modules and module instances. The method analyzes the circuit design to map module ports to appropriate pins/ports of a circuit design. Design constraints may then be automatically manipulated and propagated according to the determined mapping without manual assistance by a designer. This added capability can greatly improve ease of use, and significantly reduce the user's overhead required in managing and troubleshooting design constraints and may reduce overall design complexity in general.

Different approaches may propagate design constraints between modules and module instances in a number of different ways. In some previous approaches, constraints are manually translated for both "instance-to-module" and "module-to-instance" constraint propagations. The manual process requires design constraints to be copied from one module or module instance, modified, and added to the other module or module instance. A designer then edits the design constraints manually. The manual edits typically involve renaming of logical names for cells, nets, and/or pins such that it matches the logical hierarchy of the target design. For example, propagation of the constraint set_property MyConstraint FOO [get_cells $cell]

from a module to a module instance $inst, requires the logical name of the cell $cell to be renamed in the new design constraint to be added to the instance. After renaming the cell the new design constraint becomes set_property MyConstraint FOO [get_cells $inst/$cell].

As another example, propagation of the constraint set_property MyConstraint FOO [get_cells $inst/$cell]

from instance $inst to the module for the instance requires a similar renaming of the cell $cell in the new design constraint to be added to the module. After renaming the cell the new design constraint becomes     set_property MyConstraint FOO [get_cells $cell].

Some design constraint languages provide built-in functions that may be used to assist in the propagation of design constraints. For instance, one design constraint language, Synopsis Design Constraints (SDC), provides support on netlist queries and built-in functionalities. The SDC command current_instance allows the user to specify any cell instance as "top" instance in the hierarchy of a circuit design. This command effectively changes the scope of the design and SDC commands and design tools to operate on an abbreviated design hierarchy. For ease of explanation, the embodiments and examples are primarily described with reference to the SDC language. However, it is recognized that the embodiments may be applied to a number of other design constraints languages including but not limited to Xilinx' user constraints file (UCF), design constraint description language (DCDL), etc.

By using current_instance, the logical renaming of cells, nets, and/or pins is supported for both "module-to-instance" and "instance-to-module" constraint propagations. For example, propagation of a design constraint from a module to a module instance $inst may use current_instance to logically rename the cell of the design constraint without manual adjustment of the design constraint. For instance, the design constraint statement     set_property MyConstraint FOO [get_cells $cell]

may be added as a design constraint of an instance of the module by preceding the statement with the current_instance command as indicated in the following statements,     current_instance $inst     set_property MyConstraint FOO [get_cells $cell].

The current_instance statement sets the current instance to $inst. As a result, $cell in the set_property statement refers to $inst/$cell.

However, current_instance cannot be used to retrieve ports for an instance of a module in a circuit design. For example, get_ports query always returns the top-level ports independent of which module instance is the current instance. This limitation does not provide a built-in or necessary mapping between a module port and the corresponding pin/port of a circuit design to facilitate module-to-instance and instance-to-module design constraint propagation. For example, when dealing with module input/output (I/O) interface constraints, there are no clear guidelines as to what should be done. As indicated above, design constraints are not always propagated between ports of a module and the corresponding pins of an instantiation of the module. For instance, I/O interface constraints will be propagated differently depending on whether the I/O buffer is implemented within the module. As such, a designer has to exercise discretion to verify and make necessary modifications to module interface constraints to ensure correctness and/or desired specifications.

In one or more embodiments, a mapping is performed between pins and ports, based on connectivity, to facilitate module-to-instance and instance-to-module propagation of design constraints. Design constraints may then be automatically manipulated and propagated according to the determined mapping without manual assistance by a designer.

Two pin-port mapping scenarios may arise depending on the connectivity of the pins and ports. The first scenario arises when the module port is connected to an embedded I/O buffer (e.g., a module includes an input or an output buffer having a terminal connected to a port of the module). Design constraints on such a module port need to be propagated to a top-level port that is directly connected to the corresponding pin of the module instance (module-to-instance constraint propagation). Similarly, if there is a design constraint on a top-level port that has a direct connection to a module instance pin, then that design constraint is propagated to the corresponding module port (instance-to-module constraint propagation).

In the other use case, the module port is not connected to an I/O buffer in the module. Any constraints on such a module port will propagate to the corresponding module instance pin for "module-to-instance" constraint propagation. Likewise, if there is a constraint on a pin of a module instance that is not connected to an I/O buffer in the module instance, the design constraint is propagated to the corresponding module port for instance-to-module constraint propagation.

Figure 1:
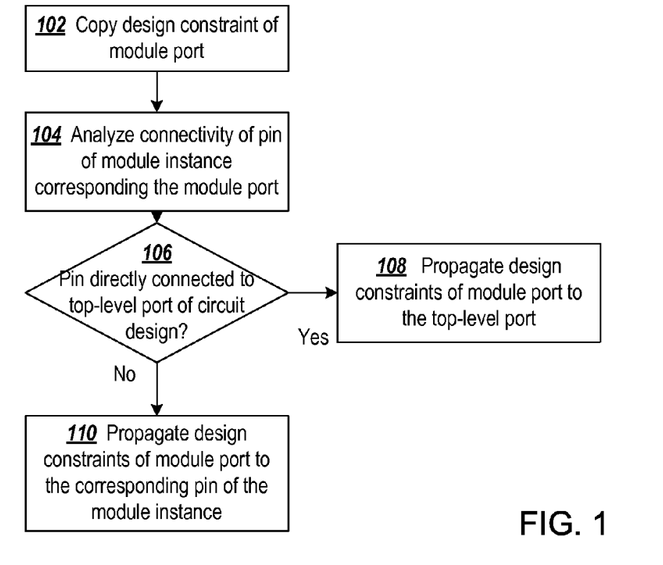
FIG. 1 shows a flowchart of a first process for module-to-instance propagation in a bottom-up design approach, consistent with one or more embodiments.

FIG. 1 shows a flowchart for module-to-instance propagation in a bottom-up design approach. Design constraints of a module port are copied at block 102. For a port of the module having a constraint, connectivity of a corresponding pin of a module instance is analyzed at block 104 to determine whether or not the port is connected to an I/O buffer within the module. The destination to which a constraint of a module port will be propagated depends on whether or not the corresponding pin in an instance is directly connected to a top-level I/O port in the circuit design. If the pin is directly connected to a top-level port of the circuit design (e.g., an I/O port), decision branch 106 causes the design constraint of the module port to be propagated to the top-level port of the circuit design that is connected to the pin of the module instance at block 108. Otherwise, if the port of the module is not directly connected to a top-level port in the circuit design, the design constraint is propagated to the corresponding pin of the module instance at block 110.

Figure 2:
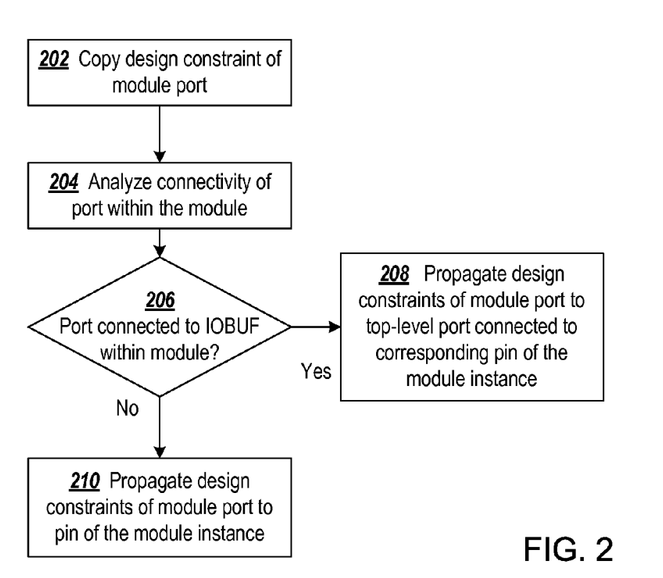
FIG. 2 shows a flowchart of a second process for module-to-instance propagation in a bottom-up design approach, consistent with one or more embodiments.

In the flowchart shown in FIG. 1, module-to-instance propagation is determined based on an upstream connectivity of the corresponding pin of the module instance in the circuit design. In some embodiments, module-to-instance propagation may be determined based on downstream connectivity of either the port of the module or the corresponding pin of the module instance. For instance, FIG. 2 shows another flowchart for module-to-instance propagation in a bottom-up design approach, in which propagation is determined based on downstream connectivity. Design constraints of a module port are copied at block 202. For a port of the module having a constraint, connectivity of the port is analyzed at block 204 to determine whether or not the port is connected to an I/O buffer within the module. The destination to which a constraint of a module port will be propagated depends on whether the corresponding pin in an instance is directly connected to an I/O port in the circuit design. If the port is connected to an I/O buffer within the module, a pin in an instance of the module (the pin corresponding to the port of the module) will be directly connected to a top level port of the circuit design (e.g., an I/O port). In this scenario, decision branch 206 causes the constraint of the module port to be propagated to the top-level port of the circuit design that is connected to the pin of the module instance at block 208. Otherwise, if the port of the module is not connected to an I/O buffer in the module, an I/O buffer must be implemented between the corresponding pin in an instance of the module and the top-level port in the circuit design. In this scenario, the constraint is propagated to the pin of the module instance at block 210.

Figure 3:
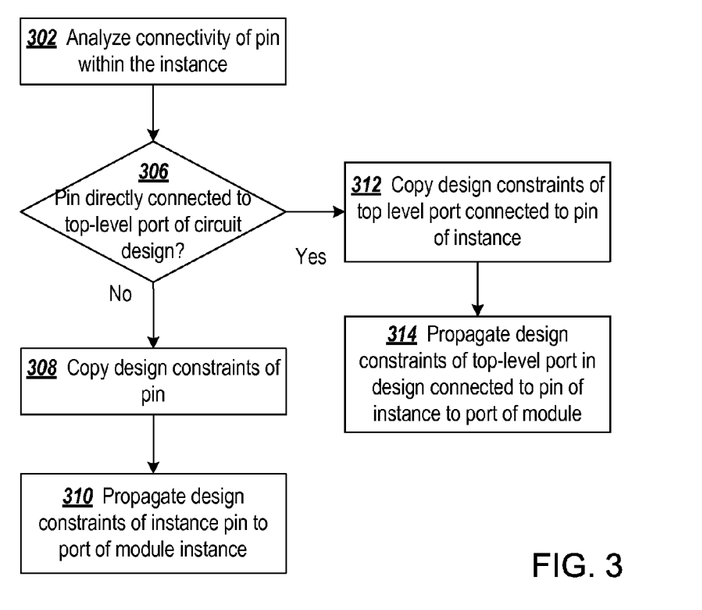
FIG. 3 shows a flowchart of a first process for instance-to-module propagation in a top-down design approach consistent with one or more embodiments.

In a top-down design approach, constraints may be propagated from pins of an instance to a port of the module in a similar manner. FIG. 3 shows a flowchart for instance-to-module propagation in a top-down design approach. In this example, propagation is determined based on upstream connectivity of a pin of the instance. Connectivity of the pin of a module instance is analyzed at block 302 to determine whether or not the port of the module is directly connected to an I/O buffer in the module. The source pin/port of constraints in the top-down approach depends on whether or not the corresponding pin in an instance is directly connected to an I/O port in the circuit design. If the pin of the module instance is connected to an I/O buffer within the module instance, the pin is directly connected to a top-level port of the circuit design (e.g., an I/O port). In this scenario, the decision branch 306 causes constraints of the top-level port to be copied at block 312 and propagated from the top-level port of the circuit design to the corresponding port of the module at block 314. Otherwise, if the pin of the module instance is not connected to an I/O buffer in the instance, decision block 306 directs the process to block 308 where constraints of the pin of the instance are copied. The copied constraints are propagated from the pin of the instance to the corresponding port of the module at block 310.

Figure 4:
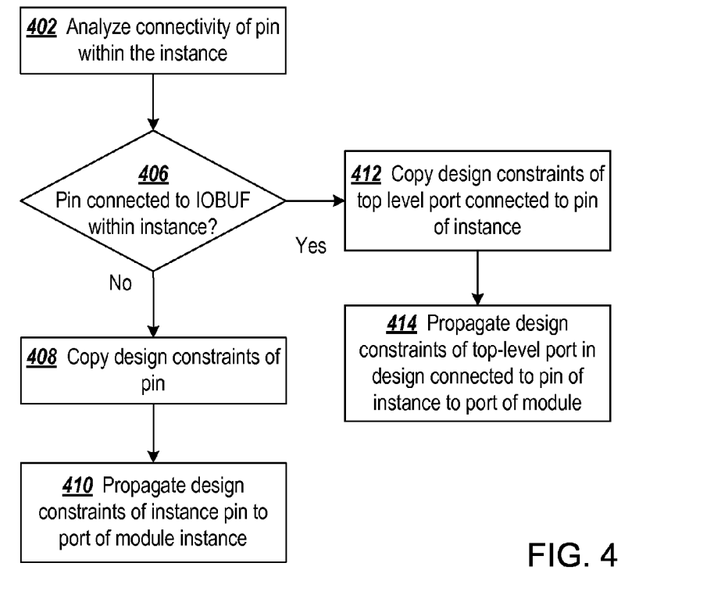
FIG. 4 shows a flowchart of a second process for instance-to-module propagation in a top-down design approach consistent with one or more embodiments.

In the flowchart shown in FIG. 3, instance-to-module propagation is determined based on an upstream connectivity of the corresponding pin of the module instance in the circuit design. In some embodiments, instance-to-module constraints propagation may be determined based on downstream connectivity of either the port of the module or the corresponding pin of the module instance. For instance, FIG. 4 shows a flowchart for instance-to-module propagation in a top-down design approach. Connectivity of a pin in an instance is analyzed at block 402 to determine whether or not the port of the module is directly connected to an I/O buffer in the module. The source pin/port of constraints in the top-down approach depends on whether or not the corresponding pin in an instance is directly connected to an I/O port in the circuit design. If the pin of the instance is connected to an I/O buffer within the instance, the pin is directly connected to a top-level port of the circuit design (e.g., an I/O port). In this scenario, the decision branch 406 causes constraints of the top-level port to be copied at block 412 and propagated from the top-level port of the circuit design to the corresponding port of the module at block 414. Otherwise, if the pin of the instance is not connected to an I/O buffer in the instance, decision block 406 directs the process to block 408 where constraints of the pin of the instance are copied. The copied constraints are propagated from the pin of the instance to the corresponding port of the module at block 410.

Figure 5:
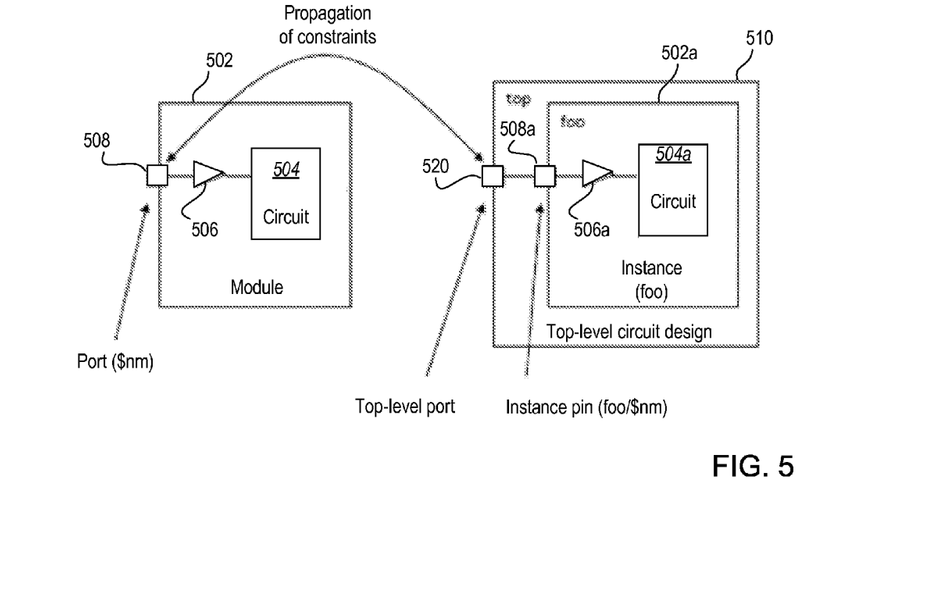
FIG. 5 illustrates a port-to-pin mapping of a module having an embedded I/O buffer.

FIG. 5 illustrates a port-to-pin mapping of a module having an embedded I/O buffer. A port 508 ($nm) of a module 502 is mapped to a destination port/pin in a circuit design 510. The destination port is determined based on connectivity of the port 508 in the module 502. In this example, module 502 includes an embedded I/O buffer 506 that acts as an interface between the module port 508 $nm and a circuit 504 of the module 502. When an instance (foo) 502a of the module 502 is incorporated into circuit design 510, pin 508a (foo/$nm), which corresponds to module port 508, is connected to circuit 504a by I/O buffer 506a. Because the instance 502a includes an embedded I/O buffer 506a, the pin 508a is directly connected to a top-level port 520 in the top-level circuit design 510.

As described with reference to FIGS. 1 through 4, because the port 508 of the module is connected to an I/O buffer (e.g., 506) in the module, the design constraints of port 508 will be propagated to a top-level port (e.g., 520) in the circuit design 510 and constraints of the top-level port will be propagated to port 508.

Figure 6:
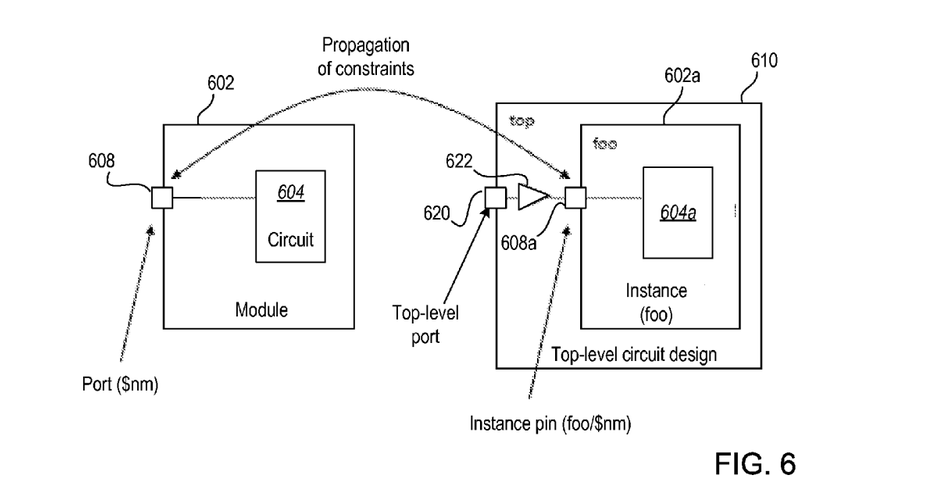
FIG. 6 illustrates a port-to-pin mapping of a module without an embedded I/O buffer.

FIG. 6 illustrates port-to-pin mapping of a module that does not have an embedded I/O buffer. A port 608 ($nm) of a module 602 is mapped to a destination port/pin in a circuit design 610. The destination port is determined based on connectivity of the port 608 in the module 602. In this example, module 602 does not include an embedded I/O buffer between the port and the circuit 604. When an instance (foo) 602a of the module 602 is incorporated into circuit design 610, an I/O buffer will be implemented between pin 608a (foo/$nm) of the instance 602a and a top-level port 620 of the circuit design 610.

As described with reference to FIGS. 1 and 2, because the port 608 of the module is not connected to an I/O buffer in the module 602, the corresponding pin 608a will be directly connected to the circuit 604a in the module instance 602a. As such, an I/O buffer 622 is included in the circuit design to act as an interface between the top level port 620 and a pin 608a of the module instance 602a. Accordingly, the design constraints of port 608 will be propagated to the corresponding pin 608a in the circuit design 610 and vice versa.

Figure 7:
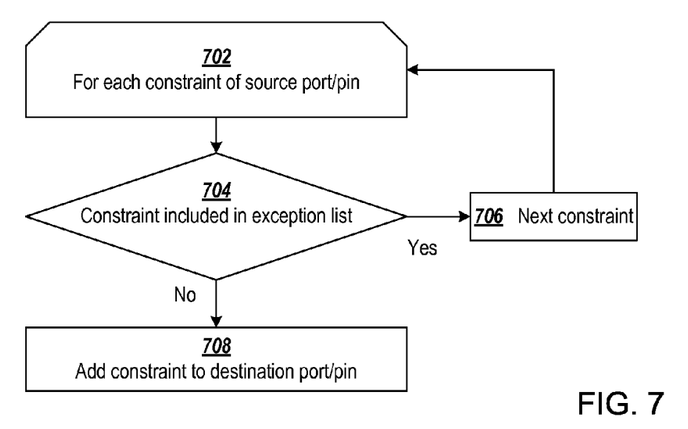
FIG. 7 shows a flowchart for propagation of constraints from a source pin/port to a destination pin/port, in accordance with one or more embodiments.

FIG. 7 shows a flowchart of propagating constraints from a source pin/port to a destination pin/port in accordance with one or more embodiments.

Source and destination port/pins for constraint propagation are selected as discussed with reference to FIGS. 1 and 2. For each constraint of the source port/pin at block 702, the process determines whether or not to propagate the constraint at decision block 704 based on a propagation rule set. In one embodiment, the propagation rule set is defined by an exception list that is used to indicate constraints that are not to be propagated. Alternatively, in another embodiment, the propagation rule set is defined include an allowed list that indicates constraints that are to be propagated. In this example, a constraint is propagated by adding the constraint to the destination port/pin at block 708 if the constraint is not listed in the exceptions list. Otherwise, if the constraint is included in the exceptions list, the constraint is not propagated and the next constraint is selected at block 706 for evaluation.

Figure 8:
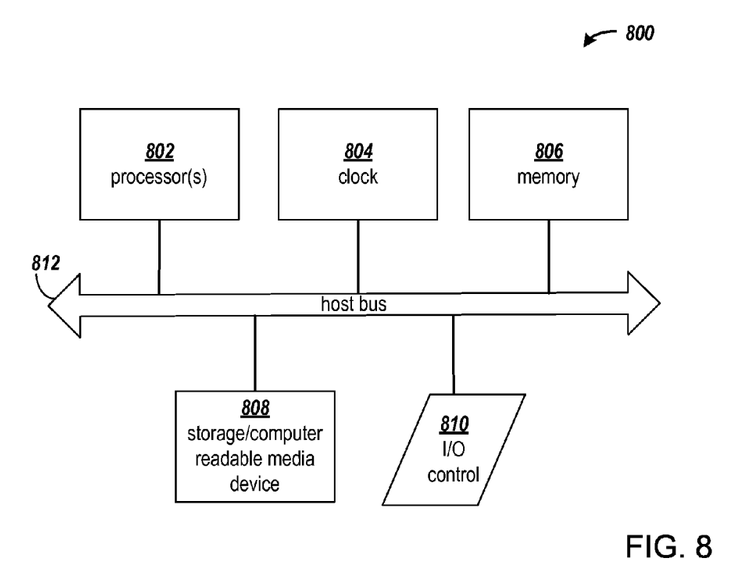
FIG. 8 shows a block diagram of an example computing arrangement that may be configured to implement the constraint propagation processes described herein.

FIG. 8 shows a block diagram of an example computing arrangement that may be configured to implement the constraint propagation processes described herein. It will be appreciated that various alternative computing arrangements, including one or more processors and a memory arrangement configured with program code, would be suitable for hosting the processes and data structures and implementing the algorithms of the different embodiments. The computer code, comprising the processes of one or more embodiments encoded in a processor executable format, may be stored and provided via a variety of computer-readable storage media or delivery channels such as magnetic or optical disks or tapes, electronic storage devices, or as application services over a network.

Processor computing arrangement 800 includes one or more processors 802, a clock signal generator 804, a memory unit 806, a storage unit 808, and an input/output control unit 810 coupled to a host bus 812. The arrangement 800 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements, as would be recognized by those skilled in the art. The processor 802 may be one or more general-purpose processors, or a combination of one or more general-purpose processors and suitable co-processors, or one or more specialized processors (e.g., RISC, CISC, pipelined, etc.).

The memory arrangement 806 typically includes multiple levels of cache memory, and a main memory. The storage arrangement 808 may include local and/or remote persistent storage such as provided by magnetic disks (not shown), flash, EPROM, or other non-volatile data storage. The storage unit may be read or read/write capable. Further, the memory 806 and storage 808 may be combined in a single arrangement.

The processor arrangement 802 executes the software in storage 808 and/or memory 806 arrangements, reads data from and stores data to the storage 808 and/or memory 806 arrangements, and communicates with external devices through the input/output control arrangement 810. These functions are synchronized by the clock signal generator 804. The resource of the computing arrangement may be managed by either an operating system (not shown), or a hardware control unit (not shown).

For instance, in some embodiments, a system for propagating design constraints may be implemented on the computing arrangement shown in FIG. 8. The storage 808 and/or memory 806 is configured with instructions that when executed by the processor 802 cause the processor to identify design constraints for a circuit design input via I/O control 810. For a port of the module, the processor 802 is configured to determine a port/pin of the circuit design, for which constraints are to be propagated with the port. The port/pin is determined by analyzing whether or not the pin of the module instance, corresponding to the module port, is directly connected to a top-level port of the circuit design. In response to determining that the pin of the module instance is directly connected to a top-level port of the circuit design, the instructions cause the processor 802 to select the top-level port as the port/pin of the circuit design. In response to determining that the pin of the module instance is not directly connected to the top-level port of the circuit design, the instructions cause the processor to select the pin of the module instance as the port/pin of the circuit design. The processor 802 is configured to propagate the design constraints between the port of the module and the selected port/pin in response to the port of the module or the port/pin of the circuit design including one or more of the design constraints. The propagated design constraints are stored in storage device 808.

The embodiments may be applicable to a variety of HDL circuit design tools. Other aspects and embodiments will be apparent from consideration of the specification. It is intended that the specification and illustrated embodiments be considered as examples only, with a true scope and spirit of the embodiments being indicated by the following claims.

What is claimed is:

1. A method for propagating design constraints between a module and a module instance in a circuit design, comprising:
    on a programmed processor, performing operations including:
        for a port of the module and a corresponding pin of the module instance, determining a port/pin of the circuit design, between which and the port of the module design constraints are to be propagated, the determining including:
            determining whether or not the pin of the module instance is directly connected to a top-level port of the circuit design;
            in response to determining the pin of the module instance is directly connected to a top-level port of the circuit design, selecting the top-level port as the port/pin of the circuit design; and
            in response to determining the pin of the module instance is not directly connected to the top-level port of the circuit design, selecting the pin of the module instance as the port/pin of the circuit design; and
        propagating design constraints between the port of the module and the selected port/pin;
        wherein the propagating of the design constraints between the port of the module and the selected port/pin includes adding design constraints from the port of the module to the selected port/pin;
        wherein the propagating of the design constraints between the port of the module and the selected port/pin includes adding design constraints from the selected port/pin to the port of the module; and
    storing the propagated design constraints in a storage device.

2. The method of claim 1, wherein the adding of the design constraints from the port of the module to the selected port/pin includes, for each design constraint of the port of the module:
    determining from a propagation rule set whether the design constraint is to be propagated; and
    in response to determining that the design constraint is to be propagated, adding the design constraint to the selected port/pin.

3. The method of claim 2, wherein the adding of the design constraint to the selected port/pin includes converting a logical name of the port of the module in the design constraint to the logical name of the selected port/pin.

4. The method of claim 1, wherein the adding of the design constraints from the selected port/pin of the circuit design to the port of the module includes, for each design constraint of the port of the module:
    determining from a propagation rule set whether the design constraint is to be propagated; and
    in response to determining that the design constraint is to be propagated, adding the design constraint to the port of the module.

5. The method of claim 2, wherein the adding of the design constraint to the port of the module includes converting a logical name of the selected port/pin of the circuit design in the design constraint to the logical name of the port of the module.

6. The method of claim 1, wherein the design constraints are formatted in a design constraints language that does not support identification of ports of a user-selected instance of the circuit design.

7. A method for propagating design constraints between a module and a module instance in a circuit design, comprising:
    on a programmed processor, performing operations including:
        for a port of the module and a corresponding pin of the module instance, determining a port/pin of the circuit design, between which and the port of the module constraints are to be propagated, the determining including:
            determining whether or not the module includes an I/O buffer connected to the port of the module;
            in response to determining the module includes an I/O buffer is connected to the port of the module, selecting as the port/pin of the circuit design, a top-level port of the circuit design that is connected to the pin of the module instance that corresponds to the port of the module; and in response to determining the module does not include an I/O buffer connected to the port of the module, selecting as the port/pin of the circuit design, the pin of the module instance that corresponds to the port of the module; and propagating design constraints between the port of the module and the selected port/pin;

wherein the propagating of the design constraints between the port of the module and the selected port/pin includes adding design constraints from the port of the module to the selected port/pin;

wherein the propagating of the design constraints between the port of the module and the selected port/pin includes adding design constraints from the selected port/pin to the port of the module; and storing the propagated design constraints in a storage device.

8. The method of claim 7, wherein the design constraints are formatted in a design constraints language that does not support identification of ports of a user-selected instance of the circuit design.

9. A system for propagating design constraints in a circuit design, comprising:

a processor; and a memory arrangement coupled to the processor, wherein the memory arrangement is configured with instructions that when executed by the processor causes the processor to perform operations including:

identifying design constraints for a circuit design;

for a port of a module of the circuit design and a corresponding pin of an instance of the module, determining a port/pin of the circuit design, between which and the port of the module, design constraints are to be propagated, the determining including:

determining whether or not the pin of the instance of the module is directly connected to a top-level port of the circuit design;

in response to determining the pin of the instance of the module is directly connected to a top-level port of the circuit design, selecting the top-level port as the port/pin of the circuit design; and in response to determining the pin of the module instance is not directly connected to the top-level port of the circuit design, selecting the pin of the module instance as the port/pin of the circuit design;

in response to the port of the module or the port/pin of the circuit design including one or more of the design constraints, propagating the one or more design constraints between the port of the module and the port/pin of the circuit design; and wherein the instructions configure and arrange the processor to propagate each of the one or more design constraints between the port of the module and the port/pin of the circuit design by adding the one or more design constraints from the port of the module to the port/pin;

wherein the instructions configure and arrange the processor to propagate each of the one or more design constraints between the port of the module and the port/pin of the circuit design by adding the design constraints from the port/pin to the port of the module.

10. The system of claim 9, wherein propagation of each of the one or more design constraints between the port of the module and the port/pin of the circuit design further includes, for each of the one or more design constraints, converting a logical name of the port of the module to a logical name of the port/pin.

11. The system of claim 9, wherein the propagating each of the one or more design constraints between the port of the module and the port/pin of the circuit design further includes, for each of the one or more design constraints, converting a logical name of the port/pin in the added design constraint to a logical name of the port of the module.

12. The system of claim 9, wherein the propagating of the design constraint is performed in response to determining from a propagation rule set that the design constraint is to be propagated.

13. The system of claim 12, wherein the propagation rule set indicates design constraints that are not to be propagated.

14. The system of claim 9, wherein the design constraints are formatted in a design constraints language that does not support identification of ports of a user-selected instance of the circuit design.

* * * * *